(12) United States Patent
Yeh et al.

(10) Patent No.: US 7,988,446 B2
(45) Date of Patent: Aug. 2, 2011

(54) MOLD ASSEMBLY

(75) Inventors: Chin-Wen Yeh, Taipei Hsien (TW); Zhen-Neng Lin, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 6 days.

(21) Appl. No.: 12/542,313

(22) Filed: Aug. 17, 2009

(65) Prior Publication Data
US 2010/0303944 A1   Dec. 2, 2010

(30) Foreign Application Priority Data
May 27, 2009   (CN) .......................... 2009 1 0302686

(51) Int. Cl.
*B29C 45/22* (2006.01)

(52) U.S. Cl. ................................... 425/572; 264/328.15
(58) Field of Classification Search .................. 425/572, 425/588; 264/328.15
See application file for complete search history.

(56) References Cited

U.S. PATENT DOCUMENTS

| | | | | |
|---|---|---|---|---|
| 5,518,389 A * | 5/1996 | Nonomura et al. | ........... | 425/572 |
| 6,749,422 B2 * | 6/2004 | Yu | ................. | 425/572 |
| 7,287,977 B2 * | 10/2007 | Serniuck et al. | ............. | 425/564 |
| 7,785,099 B2 * | 8/2010 | Sakaki | ......................... | 425/549 |
| 7,803,306 B2 * | 9/2010 | Babin et al. | .................. | 425/572 |
| 2004/0137107 A1 * | 7/2004 | Babin et al. | .................. | 425/572 |
| 2004/0214371 A1 * | 10/2004 | Mahmood | ..................... | 438/106 |
| 2006/0228442 A1 * | 10/2006 | Fischer et al. | ................ | 425/572 |
| 2008/0292745 A1 * | 11/2008 | Shmitz | ......................... | 425/547 |
| 2009/0181120 A1 * | 7/2009 | Fairy | ............................ | 425/566 |

* cited by examiner

*Primary Examiner* — Tim Heitbrink
(74) *Attorney, Agent, or Firm* — D. Austin Bonderer

(57) ABSTRACT

A mold assembly includes an upper mold cavity, a base plate, and a flow element. The upper mold cavity defines a primary runner and a plurality of sub-runners on a top surface in communication with the upper mold cavity. A gate is defined in the primary runner for injecting liquefied plastic into the upper mold cavity. The base plate defines an outlet thereon corresponding to the gate for outputting the liquefied plastic. The upper mold cavity and the base plate corporately form a closed cavity therebetween. The flow element is received in the closed cavity and movable between a first position and a second position. In the first position, the flow element is engaged with the primary runner and plurality of sub-runners. In the second position, the flow element is separated with the primary runner and plurality of sub-runners.

7 Claims, 3 Drawing Sheets

MOLD ASSEMBLY

BACKGROUND

1. Technical Field

The present disclosure relates to mold assemblies, and particularly to a mold assembly with a flow element.

2. Description of Related Art

Computers have become increasingly popular for general use. Manufacturers are striving to design varieties of portable computers to please users. Therefore, the ornamental design of the enclosure of the computer becomes more and more important for attracting users. Many plastic ornaments, which have different shapes and colors, are attached on the computer enclosure to beautify the computer enclosure. However, for manufacturing these beautiful computer enclosures, the procedure is complex. Firstly, stamping molds to stamp metal plates into required shapes to form a computer chassis are needed. Then, an injection mold to shape the plastic ornaments is needed. Eventually the plastic ornaments are mounted on the computer chassis. In the injection procedure, liquefied plastic is injected into the injection mold by an injection molding machine. However, some of the liquefied plastic flows in the primary runner and a plurality of sub-runners on a top surface of the injection mold, which cools down in the primary runner and plurality of sub-runners later and forms a plurality of plastic scraps. This amounts to waste.

BRIEF DESCRIPTION OF THE DRAWINGS

Many aspects of the embodiments can be better understood with references to the following drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION

Figure 1:
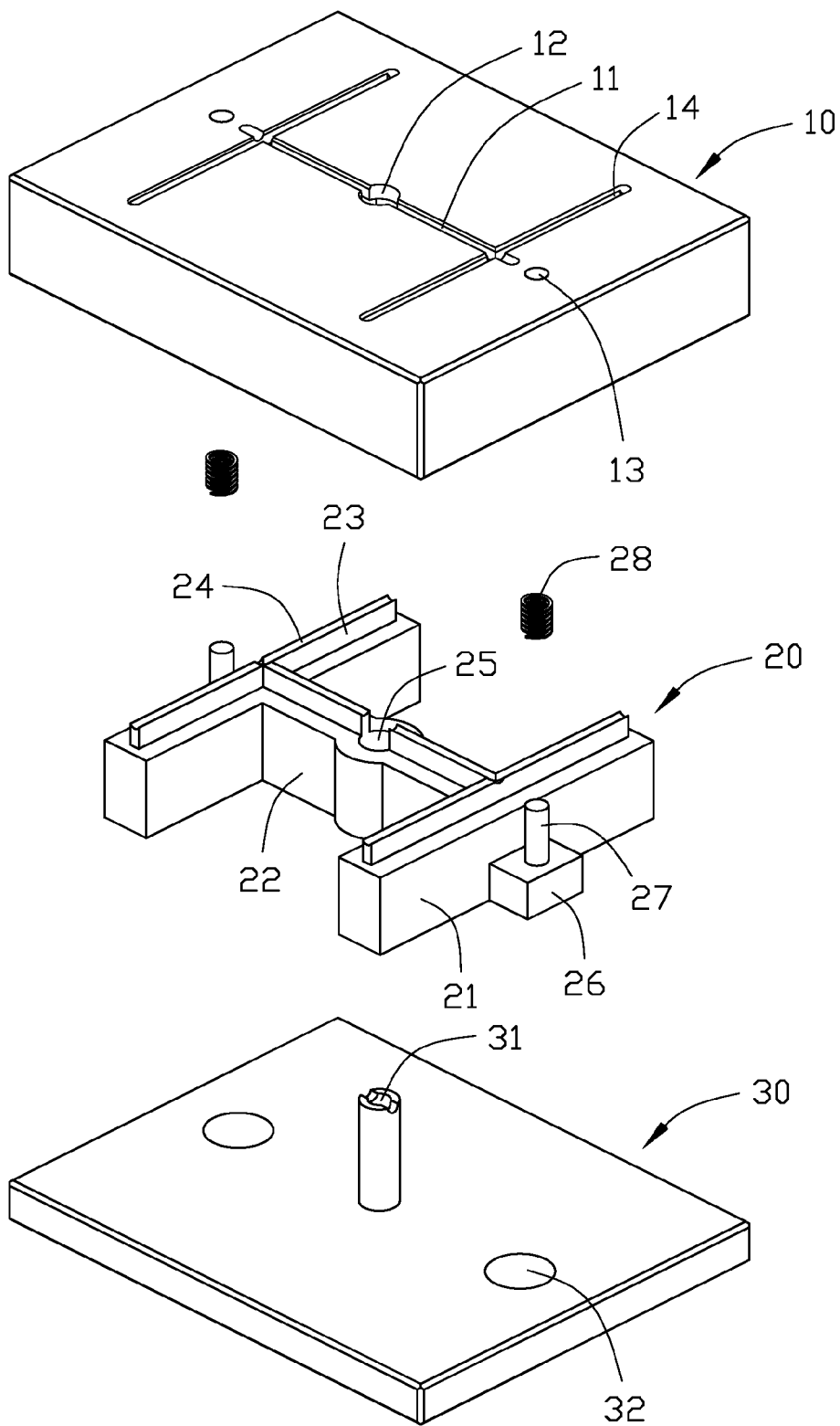
FIG. 1 is an exploded view of an embodiment of a mold assembly.
Figure 2:
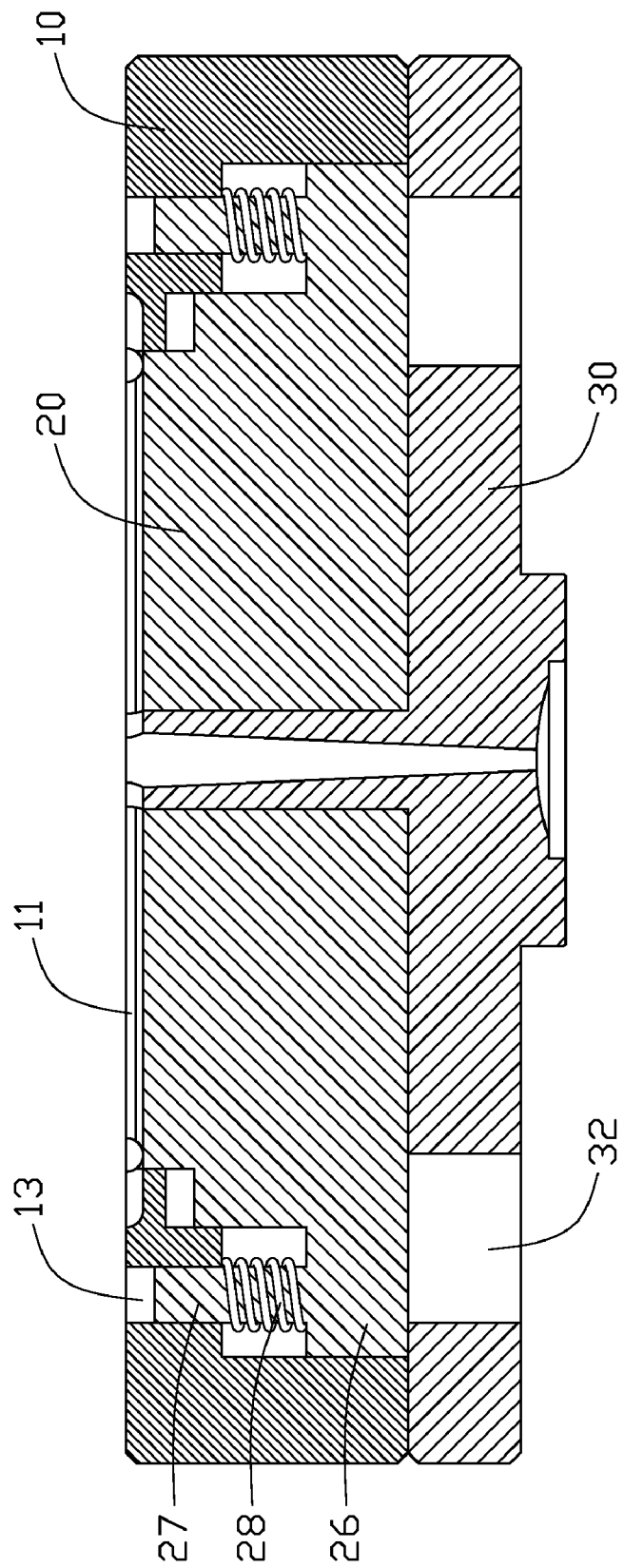
FIG. 2 is an isometric cut-away assembled view of the mold assembly of FIG. 1 in one state.

Referring to FIGS. 1 and 2, a mold assembly includes an upper mold cavity 10, a flow element 20, and a base plate 30. The mold assembly is used to receive liquefied plastic from an injection molding machine (not shown).

The upper mold cavity 10 defines a primary runner 11 and a plurality of sub-runners 14 on a top surface in communication with the upper mold cavity 10. A gate 12 is defined in the primary runner 11 for injecting liquefied plastic into the upper mold cavity 10. Two accommodating holes 13 are respectively defined in the upper mold cavity 10 at two sides of the plurality of sub-runners 14.

The flow element 20 includes two parallel arms 21, and a connection arm 22 perpendicular to the parallel arms 21 therebetween. The flow element 20 defines a plurality of protrusions 23 corresponding to the primary runner 11 and the plurality of sub-runners 14. Each protrusion 23 defines a groove 24 in a top surface thereof. The connection arm 22 defines a channel 25 in the middle corresponding to the gate 12 of the upper mold cavity 10. A pressing tab 26 extends outward from the middle of arm 21. Each pressing tab 26 defines a guiding column 27 thereon which is movably received in the corresponding accommodating holes 13. Two springs 28 are positioned on the guiding columns 27.

The base plate 30 defines an outlet pipe 31 thereon corresponding to the gate 12 and the channel 25 for outputting the liquefied plastic, and two through holes 32 on two sides of the outlet 31 corresponding to the two pressing tabs 26. The upper mold cavity 10 and the base plate 30 cooperatively form a closed cavity therebetween. In this embodiment, the base plate 30 is positioned on a stamping machine (not shown). The stamping machine (not shown) presses the flow element 20 upwardly through the through holes 32 on the base plate 30 and the pressing tabs 26 on two sides of the flow element 20.

Figure 3:
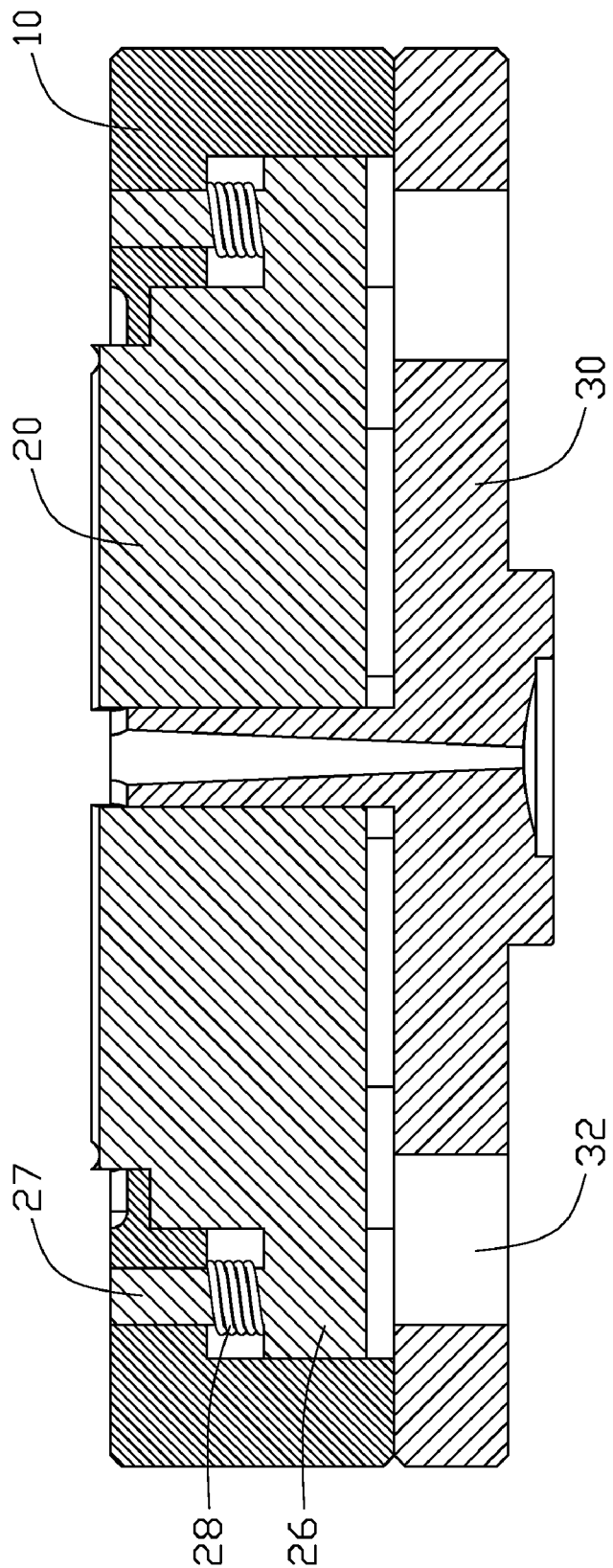
FIG. 3 is an isometric cut-away assembled view of the mold assembly of FIG. 1 in another state.

Referring to FIG. 3, in use, the injection molding machine (not shown) injects liquefied plastic into the upper mold cavity 10 via the gate 12 until the upper mold cavity 10 has a certain capacity, such as 80%., The injection molding machine (not shown) stops injecting the liquefied plastic once the capacity is reached. Then the stamping machine (not shown) presses the flow element 20 upwardly to drive the flow element 20 to move toward the primary runner 11 and plurality of sub-runners 14. The springs 28 are elastically deformed. The plurality of protrusions 23 presses the liquefied plastic in the primary runner 11 and plurality of sub-runners 14 through the grooves 24. The liquefied plastic quickly flows into the channel 25 because of the pressure from the primary runner 11 and plurality of sub-runners 14. And very little liquefied plastic remains to cool down in the primary runner 11 and the plurality of sub-runners 14 to form plastic scraps. This improves efficiency, saves time, and saves money. Further, the pressure from the primary runner 11 and plurality of sub-runners 14 also helps the liquefied plastic to flow out from the outlet 31 at an even rate. After the liquefied plastic flows from the outlet 31, the stamping machine (not shown) is retracted from the base plate 30. The springs 28 elastically return to a normal state and the flow element 20 moves away from the primary runner 11 and plurality of sub-runners 14.

It is to be understood, however, that even though numerous characteristics and advantages of the embodiments have been set forth in the foregoing description, together with details of the structure and function of the embodiments, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A mold assembly, comprising:
    an upper mold cavity defining a primary runner and a plurality of sub-runners on a top surface, and a gate defined in the primary runner capable of injecting liquefied plastic into the upper mold cavity;
    a base plate defining an outlet thereon corresponding to the gate for outputting the liquefied plastic, the upper mold cavity and the base plate corporately form a closed cavity therebetween; and
    a flow element received in the closed cavity, wherein the flow element is movable between a first position and a second position; in the first position, the flow element is engaged with the primary runner and plurality of sub-runners; in the second position, the flow element is separated with the primary runner and plurality of sub-runners.

2. The mold assembly of claim 1, wherein the flow element defines a plurality of protrusions thereon corresponding to the primary runner and plurality of sub-runners, each protrusion defines a groove thereon.

3. The mold assembly of claim 2, wherein the flow element comprises two parallel arms, and a connection arm between the two parallel arms, the plurality of protrusions and corresponding grooves are formed on the parallel arms and connection arm.

4. The mold assembly of claim 3, wherein the connection arm defines a channel corresponding to the gate on the upper mold cavity and the outlet on the base plate.

5. The mold assembly of claim 3, further comprising two pressing tabs extending from the two parallel arms, each pressing tab comprises a guiding column, wherein two springs are positioned on the guiding columns.

6. The mold assembly of claim 5, wherein the parallel arms and connection arm form a shape similar to a shape formed by the primary runner and plurality of sub-runners.

7. The mold assembly of claim 5, wherein the upper mold cavity further comprises two accommodating holes corresponding to the two guiding columns, the base plate further comprises two through holes corresponding to the two pressing tabs.

* * * * *